(12) United States Patent
Marty et al.

(10) Patent No.: US 8,200,377 B2
(45) Date of Patent: Jun. 12, 2012

(54) SYSTEM FOR SECURING AN AIRCRAFT FLIGHT PLAN

(75) Inventors: Nicolas Marty, Saint Sauveur (FR); Aurélie Sallier, Toulouse (FR); Philippe Salmon, Colomiers (FR)

(73) Assignee: Thales (FR)

( * ) Notice: Subject to any disclaimer, the term of this patent is extended or adjusted under 35 U.S.C. 154(b) by 727 days.

(21) Appl. No.: 12/270,166

(22) Filed: Nov. 13, 2008

(65) Prior Publication Data

US 2009/0132103 A1 May 21, 2009

(30) Foreign Application Priority Data

Nov. 13, 2007 (FR) ...................................... 07 07964

(51) Int. Cl.
*G05D 1/00* (2006.01)
(52) U.S. Cl. .................. 701/3; 701/10; 701/14
(58) Field of Classification Search .................... 701/14, 701/16, 201, 202, 206, 210, 3–5, 7, 10
See application file for complete search history.

(56) References Cited

U.S. PATENT DOCUMENTS

| | | | |
|---|---|---|---|
| 6,161,063 A | 12/2000 | Deker | |
| 6,529,821 B2* | 3/2003 | Tomasi et al. | 701/202 |
| 6,546,338 B2* | 4/2003 | Sainthuile et al. | 701/301 |
| 6,571,171 B1 | 5/2003 | Pauly | |
| 6,816,780 B2* | 11/2004 | Naimer et al. | 701/206 |
| 7,194,353 B1 | 3/2007 | Baldwin et al. | |
| 7,912,594 B2* | 3/2011 | Gremmert | 701/9 |
| 2007/0005199 A1* | 1/2007 | He | 701/16 |
| 2007/0088467 A1* | 4/2007 | H. Knotts | 701/14 |
| 2010/0030467 A1* | 2/2010 | Wise et al. | 701/204 |

FOREIGN PATENT DOCUMENTS

JP 408166465 A * 6/1996

* cited by examiner

*Primary Examiner* — Thomas Black
*Assistant Examiner* — Marthe Marc-Coleman
(74) *Attorney, Agent, or Firm* — Lowe Hauptman Ham & Berner, LLP (57) ABSTRACT

The system for securing an aircraft flight plan has a flight management system delivering: a flight plan and points comprising passage setpoints in terms of speed, altitude and time; an avionics computer; at least one resource for storing environmental data constituting a hazard for the aircraft; a performance model of the aircraft defining limiting flight conditions according to the performance capabilities of said aircraft; at least one resource for processing the aircraft's avoidance trajectories. It makes it possible, based on a sampling of points of the flight plan, to calculate a set of avoidance trajectories and correlate them with the environmental data in order to detect the engagement points requiring a corrective maneuver.

19 Claims, 6 Drawing Sheets

FIG.5 ental data analysis system is the WXR system, the marketing name given to the product developed and marketed by Rockwell Collins (weather radar system). This equipment is used in many aircraft. It comprises a radar antenna, which continually sweeps an angular segment situated in front of the carrier over a parameterizable distance. This equipment analyzes the atmosphere to recover weather data and supply it to the pilot.

SYSTEM FOR SECURING AN AIRCRAFT FLIGHT PLAN

RELATED APPLICATIONS

The present application is based on, and claims priority from French Application Number 07 07964, filed Nov. 13, 2007, the disclosure of which is hereby incorporated by reference herein in its entirety.

TECHNICAL FIELD

The present invention relates to a system for predicting hazardous situation warning areas for aircraft, a warning area being an area for which a passage of the aircraft in its proximity generates a warning to the crew indicating to it the proximity of a hazard.

The system applies more particularly to the identification of warning areas, before or during a flight, by correlation on the one hand of the vertical and lateral avoidance flight profiles and the speed and altitude profiles in a predetermined flight plan and on the other hand the digital models of terrain, obstacles and weather conditions in proximity to the flight plan.

BACKGROUND OF THE INVENTION

Currently, aircraft are generally equipped with risk area monitoring and warning devices. The risks can be weather-related or relating to collision with obstacles or with the terrain.

Regarding the detection of obstacle or terrain areas, the TAWS system, or "Terrain Awareness & Warning System", as standalone computer or incorporated with a TCAS ("Terrain Collision Avoidance System") function, fulfills a terrain collision avoidance monitoring function throughout a flight.

Regarding the detection of potentially hazardous areas and the prediction of how they change in time, an example of an existing environmental data analysis system is the WXR system, the marketing name given to the product developed and marketed by Rockwell Collins (weather radar system). This equipment is used in many aircraft. It comprises a radar antenna, which continually sweeps an angular segment situated in front of the carrier over a parameterizable distance. This equipment analyzes the atmosphere to recover weather data and supply it to the pilot.

Moreover, there are digital weather data models, the information is collected from a certain number of radars on board or located on the ground in real time by a ground station. These digital models can be on board an aircraft in a database and can change over time according to predictions.

In the same way, digital data models of the obstacles and terrain are on board the aircraft.

One aim of these systems is to alert the crew by issuing audible or visual messages on an exceptional approach of the relief or of an obstacle or even in the presence of violent winds or weather conditions that constitute a risk to the safety of the aircraft.

Generally, these hazardous area avoidance systems compare, in real time, a theoretical lateral and/or vertical avoidance trajectory obtained from the capabilities of the aircraft and the data of the potentially hazardous areas.

The calculated trajectory is an extrapolation over a certain duration of the travel of the aircraft in limiting conditions dependent on the performance characteristics of the aircraft.

One drawback of these systems lies in that, on the one hand, the warning of hazardous areas applies only in a near future of a few minutes at most and, on the other hand, that it is not possible to determine in advance potentially hazardous areas in proximity of the trajectory of the aircraft, notably before a flight.

Moreover, on preparing a flight, on the ground, the crew defines a flight plan in the aircraft's computer, which is generally proposed by air traffic control. The flight plan generally comprises a series of points, known in the aeronautical world as "waypoints", linking a point of departure to a point of arrival. Two successive waypoints generally form a LEG which is a segment or an arc in space. The waypoints are defined by a position in space and comprise information of use to the aircraft such as the altitude and the speed of passage recommended on a passage in proximity to a waypoint or even the predicted passage time.

The flight plans can include waypoints in proximity to hazardous areas or areas including a risk to the safety of the aircraft. It can notably concern mountains, for example, when the latter are situated in proximity to an airport. Moreover, since the weather conditions are random and not always predictable, the flight plans generated by air traffic control do not take into consideration all the weather factors and how they change based on predictions, the updates of the weather database in the aircraft not being systematically carried out.

The American patents U.S. Pat. No. 6,421,603 and U.S. Pat. No. 6,816,780 propose an enhancement on generating a flight plan by taking into account the trajectory to be followed by the aircraft obtained from the flight plan. The solution of these two patents proposes to correlate the trajectory generated from the flight plan of an aircraft and hazard volumes intercepting the trajectory.

This correlation makes it possible to identify the points of the trajectory that include a certain hazard, but it does not make it possible to warn of a hazard close to the trajectory and notably of the warnings that can be issued on the planned passage in proximity to hazard areas.

In these conditions, one drawback of these systems lies in that only the points that present a definite conflict with the terrain or the weather phenomena are taken into account, that is, when the aircraft would already have reached the hazard point.

In these conditions, the aircraft travels a predefined flight plan and the crew has to carry out, as the cases present themselves, corrective maneuvers in real time according to the warnings issued on passage in proximity to hazardous areas that are not identified because they do not strictly intercept the pre-generated trajectory, but do not however respect the required safety margins. In addition to the danger of the proximity of a risk area, some of these warnings can also constitute a nuisance, given their number, the latter originating from passages in proximity to hazardous areas that are not taken into account in generating the initial flight plan.

SUMMARY OF THE INVENTION

One aim of the invention is notably to remedy this drawback, by proposing to simulate in advance the extrapolated lateral and vertical trajectories corresponding to the evasive maneuvers to be carried out on the appearance of a warning, based on sampled points of the flight plan, and to correlate these extrapolated trajectories with the presence of hazardous areas. This simulation relies on the creation of a so-called "5D" trajectory generated from the flight plan comprising the trajectory to be followed, the sampling pitch and passage setpoints at the sampled points. These setpoints are notably: the speed of passage, the position of the points and the time of passage at the points of the flight plan.

Advantageously, the simulation makes it possible to detect the points at which appear the short-term warnings generated by the TAWS or WXR-type systems and thus specify to the crew the point from which a modification of its route must be considered in order to remain outside of any hazardous situation.

Advantageously, the simulation of these trajectories and their correlation with hazardous areas can be performed before the flight, provided that the flight plan is known, a sampling of the flight plan being chosen by the crew or being imposed by the system.

Advantageously, the system for securing an aircraft flight plan comprises:
- a flight management system delivering, from input setpoints, a scheduled trajectory defining a path to be followed by the aircraft to link a point of departure to a point of arrival, the scheduled trajectory comprising a set of points identified in space by at least a longitude and a latitude, each of the points comprising passage setpoints at these points in terms of speed, altitude and time;
- an avionics computer having resources allocated to the various functions of the aircraft;

Advantageously, the computer samples a set of points of the scheduled trajectory, the sampling pitch being predetermined, each of the points comprising a position, the heading to be followed, the speed profile on passing the position and the passage time, this set of points being called "5D trajectory".

Advantageously, the system comprises at least one resource for storing a first set of terrain data and a second set of weather data dependent on time, the data of both sets comprising areas of space forming a potential threat to the aircraft, and the computer for each sampled point of the 5D trajectory evaluates whether the point belongs to one of the areas constituting a threat.

Advantageously, the system comprises a description model of the trend of the winds in a determined navigation area.

Advantageously, the scheduled trajectory is a straight line generated from the instantaneous gradient of the aircraft.

Advantageously, the system comprises:
- a performance model of the aircraft defining limiting flight conditions according to the performance capabilities of said aircraft;
- at least one processing resource making it possible to calculate avoidance trajectories at each of the sampled points of the 5D trajectory according to the passage conditions at the sampled points and to at least an avoidance profile established from the performance model of the aircraft during a limited period.

Advantageously, the avoidance profile is a lateral trajectory.

Advantageously, the avoidance profile is a vertical trajectory.

Advantageously, the computer collects the points in space, called "interference points", that correspond to the interferences between the points of the avoidance trajectories generated from each sampled point of the 5D trajectory and of the areas obtained from the database constituting a threat.

Advantageously, the computer collects all the origins of the avoidance trajectories having at least one interference point; such an origin is called "critical point".

Advantageously, the vertical avoidance trajectories are extrapolated terrain and obstacle avoidance trajectories comprising a first segment corresponding to the reaction time, a curve corresponding to the change of heading of the aircraft, and a second segment corresponding to the climb of the aircraft.

Advantageously, the lateral avoidance trajectories are extrapolated lateral trajectories for avoiding weather areas constituting a threat to the aircraft.

Advantageously, the extrapolated lateral trajectories for avoiding weather areas substantially form an arc of circle.

Advantageously, the sampling pitch of the 5D trajectory is substantially equal to the length of a vertical avoidance trajectory.

Advantageously, the sampling pitch of the 5D trajectory is substantially equal to the mean radius of the circle comprising a lateral avoidance trajectory.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Hereinafter in the description, the expression "scheduled trajectory of an aircraft" will be used to mean the trajectory to be followed which is generated by the FMS from the flight plan and the waypoints.

Figure 1:
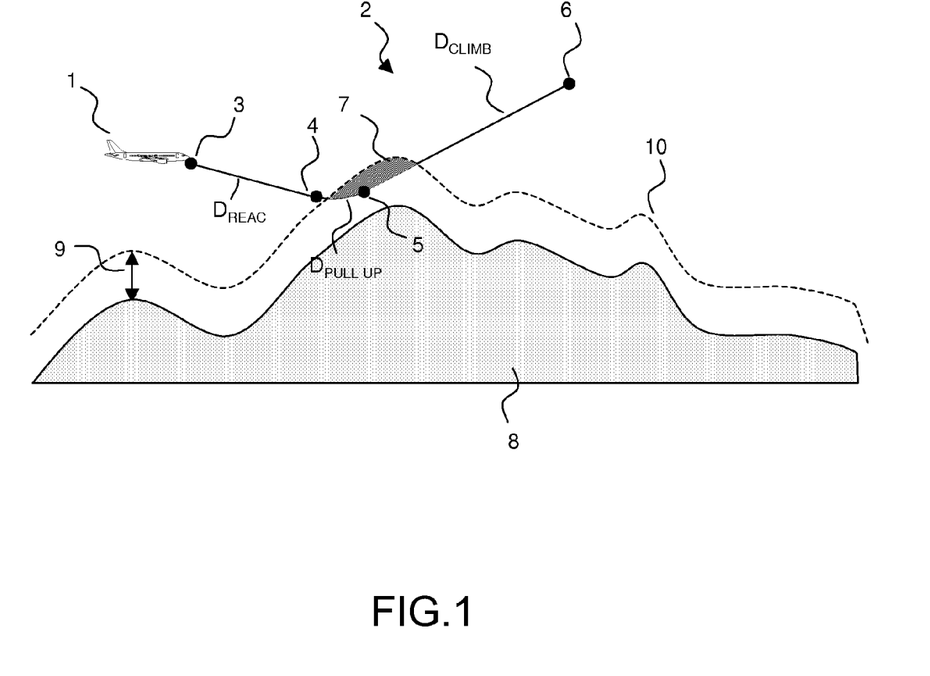
FIG. 1 represents an obstacle or relief avoidance trajectory of an aircraft.

FIG. 1 presents a vertical trajectory 2 extrapolated in the context of existing functions for avoiding terrain 8. This extrapolated trajectory 2 is calculated in the systems from a real position 3 of an aircraft 1.

In the present invention, the profile of this extrapolated trajectory 2 is used to secure all of the scheduled trajectory, the latter not being represented in FIG. 1. For a set of sampled points of the scheduled trajectory from which the extrapolated trajectories are calculated, the invention makes it possible to define a safety area around the scheduled trajectory. The invention makes it possible to warn of the proximity of the terrain 8 by taking into account a safety margin 9 over the whole of the scheduled trajectory and to calculate the hazardous areas 7 for which the extrapolated trajectories intercept either the safety margin 9 or the terrain 8.

An example of calculated trajectory is broken down into three parts: two segments and a curve. A first segment, formed by a first position 3 representing the nose of the aircraft and a second position 4, represents the trajectory of the aircraft along its instantaneous heading and ground speed, this portion of the trajectory being calculated over a fixed duration. This first duration is denoted $D_{REAC}$, and it can be 20 seconds for example. A second part of the trajectory represents the curve of the trajectory making it possible to fly the aircraft from the second position 4 to a third position 5. This trajectory corresponds to the path followed for a fixed determined duration, denoted $D_{PULL-UP}$, necessary for the aircraft to be in a climb situation. The third segment represents, with constant heading, the climb trend of the aircraft for a fixed duration, denoted $D_{CLIMB}$, by taking into consideration the instantaneous speed of the aircraft. This segment begins from the start-of-climb position 5 and ends at the last calculated position 6 of the trajectory.

The durations $D_{REAC}$, $D_{PULL-UP}$, $D_{CLIMB}$, are generally fixed regardless of the topology of the terrain being flown over or the conditions outside the aircraft, the sum of these durations being called extrapolation time.

This trajectory is established currently in certain aircraft so as to know the situation and the positioning of the aircraft in a near-future time in order to warn the crew of an imminent hazard.

This trajectory is calculated according to the initial conditions at the position 3, such as the altitude and the speed, and performance information concerning the aircraft, including the vertical maneuver capabilities.

The system according to the invention makes it possible to use the profile of this vertical trajectory by considering not a point corresponding to a real position of the aircraft but a set of points of the scheduled trajectory of which the passage conditions are known, in terms of altitude, speed and position.

Regarding the weather hazard detection systems, a lateral flight profile is generally used in flight condition to identify the imminent hazards.

Figure 2:
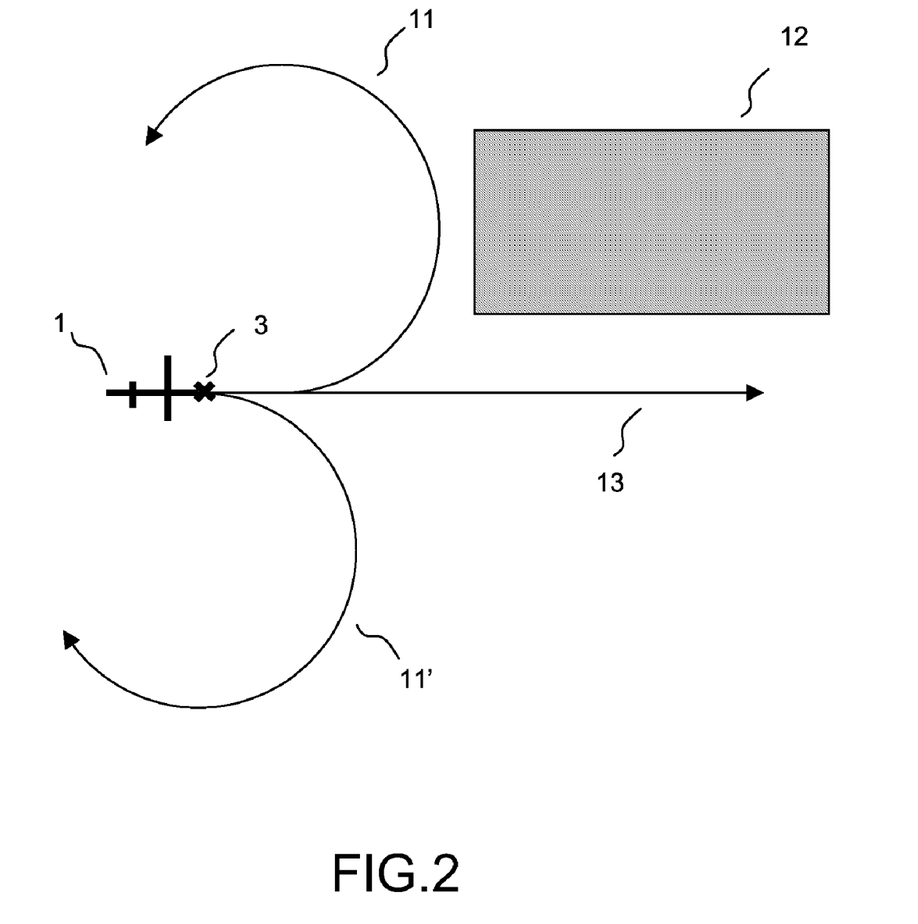
FIG. 2 represents a weather disturbance area avoidance trajectory.

FIG. 2 represents a lateral avoidance trajectory 11, 11' calculated according to initial navigation conditions at the position 3 of an aircraft 1 and a theoretical lateral avoidance capacity of the aircraft. The lateral trajectory calculated in this way is correlated with a digital weather data model. In the example of FIG. 2, the area 12 comprises an area of turbulence. In case of interception between the calculated trajectory 11, 11' and the area 12, an alarm is generated to the crew in order for corrective measures to be undertaken on the trajectory of the aircraft.

In the same way, the system according to the invention makes it possible to use this lateral avoidance trajectory profile by considering not a point corresponding to a real position of the aircraft but corresponding to a set of points of the scheduled trajectory of which the passage conditions are known in terms of speed and position.

The system according to the invention proposes to calculate extrapolated trajectories for avoiding obstacles or weather areas comprising a potential hazard according to a set of sampled points of the scheduled trajectory, the flight plan making it possible to generate the scheduled trajectory that can be generated either before a takeoff of an aircraft, or during the flight in a procedure to return to a flight plan for example.

The system according to the invention makes it possible to deal immaterially with terrain, obstacle and weather data by dissociating the lateral and vertical trajectories from their original vocation. Thus, a lateral avoidance trajectory can be correlated with a terrain database and conversely a vertical avoidance trajectory can be correlated with a weather database.

In a first embodiment, the system according to the invention makes it possible to generate a set of extrapolated vertical and lateral trajectories and correlate them with data obtained from terrain or obstacle databases.

In a second embodiment, the system according to the invention makes it possible to generate a set of extrapolated vertical and lateral trajectories and correlate them with weather data obtained from weather databases.

A preferred embodiment can combine the above two modes.

Initially, the system according to the invention generates a trajectory called 5D comprising a set of points sampled according to a predetermined pitch of the scheduled trajectory obtained from the flight plan.

The system according to the invention comprises a flight management system, the latter delivers a flight plan generally before a takeoff of the aircraft. The flight plan generally comprises a set of waypoints at which passage setpoints are recommended to the crew, notably the speeds of passage at the various waypoints, the altitude positions of the waypoints, the latitude and longitude and the passage times planned for each waypoint.

Moreover, the scheduled trajectory of the aircraft generated from the flight plan is constructed by the FMS. The flight computer makes it possible to define the scheduled trajectory by a set of passage points and associated flight setpoints by extrapolating the passage conditions of the waypoints of the flight plan.

Hereinafter, the terms "passage points" and respectively "passage conditions" will be used to denote the points and conditions obtained from the generation by the FMS of the scheduled trajectory from the waypoints and setpoints in the flight plan.

The passage points of the scheduled trajectory are generally different from the waypoints in the flight plan.

The passage conditions of a set of points of the scheduled trajectory of the aircraft are defined from passage setpoints in terms of position, altitude, speed and date of passage of the waypoints.

The extrapolation of the passage points and of the passage conditions of the scheduled trajectory of the aircraft from the waypoints of the flight plan is performed immediately a change of speed profile or of vertical or horizontal profile is detected from the flight plan.

In another step, the system according to the invention enables the onboard computer to perform a sampling of the scheduled trajectory. The sampled points can be identical to the passage points generated by the FMS, but can be different. In the latter case, a second extrapolation from the scheduled trajectory, performed by the onboard computer, makes it possible to obtain the passage conditions of the sampled points of the scheduled trajectory.

In an embodiment, the sampling pitch can be selected by the crew. In another embodiment, the sampling pitch of the scheduled trajectory can be predefined.

The whole formed by the scheduled trajectory and the passage conditions at the sampling points makes it possible to define a trajectory, called "5D trajectory" hereinafter in the description, the notation "5D" representing the altitude, the latitude and the longitude of a point of the scheduled trajectory and the speed of passage and time of passage at this point.

In an embodiment, a 5D trajectory is established on the ground from the flight plan and the passage setpoints from air traffic control.

In another embodiment, for example on rejoining a flight plan, the rejoining trajectory can generate a 5D trajectory from a rejoining flight plan. In the latter case, it is a portion of 5D trajectory established in flight.

The system according to the invention makes it possible to correlate the positions of the points of the 5D trajectory with one or more databases included in the system according to the invention. The latter data comprise the description of areas of space, the latter defining obstacles or the vertical profile of the terrain or even weather areas.

Hereinafter, the set of data models and the databases describing topology, obstacles or weather will be called "environmental database". The data in this database notably comprise potential threat information graduated, for example, according to the altitude of the obstacles, the topology of the relief, the density of rainfall in certain areas or even the intensity of certain localized storms.

A hazard indication is defined as the correlation of a real or extrapolated position of the aircraft with the threat information.

Certain data in the environmental database depend on time. Notably, the weather data, originating from the digital weather model, represent points of potentially hazardous areas and the data predicting how they change in time.

The system according to the invention is then capable, by construction of the 5D trajectory and of the prediction of how certain data changes in time, of establishing for each of the points of the 5D trajectory an evaluation of the hazard indication.

This evaluation can be performed on the ground provided that the flight plan is defined in the flight management system or in flight on establishing a trajectory to be followed.

Figure 3A:
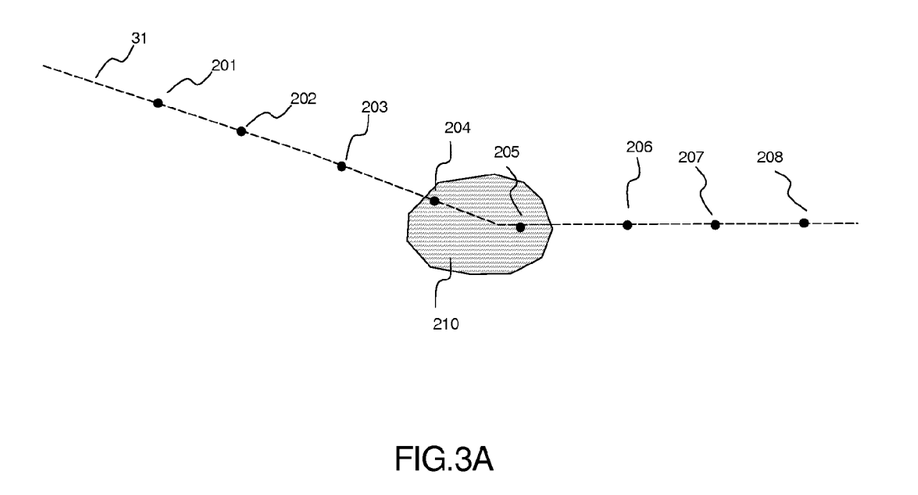
FIG. 3A represents a sampling of points of a trajectory of a flight plan and a hazardous area changing over time.

FIG. 3A represents a flight plan 31 comprising a set of sampled points 201, 202, 203, 204, 205, 206, 207, 208 of the 5D trajectory. Knowing the flight plan, the setpoints of the passage times at each of the points of the trajectory and the predictions of how the points of an area 210 including a potential threat to the aircraft change, the system according to the invention is capable of establishing a subset of points 204, 205 of the 5D trajectory, whose position will correspond to a hazard indication which corresponds to the presence of a hazardous area intercepting the 5D trajectory.

Moreover, the system according to the invention makes it possible, from lateral and/or vertical avoidance trajectory profiles, described in FIGS. 1 and 2, to generate the extrapolation trajectories from the set of sampled points of the 5D trajectory. For each of the sampled points of the 5D trajectory, the extrapolated trajectory is calculated from passage conditions at each point and aircraft performance characteristics.

Figure 3B:
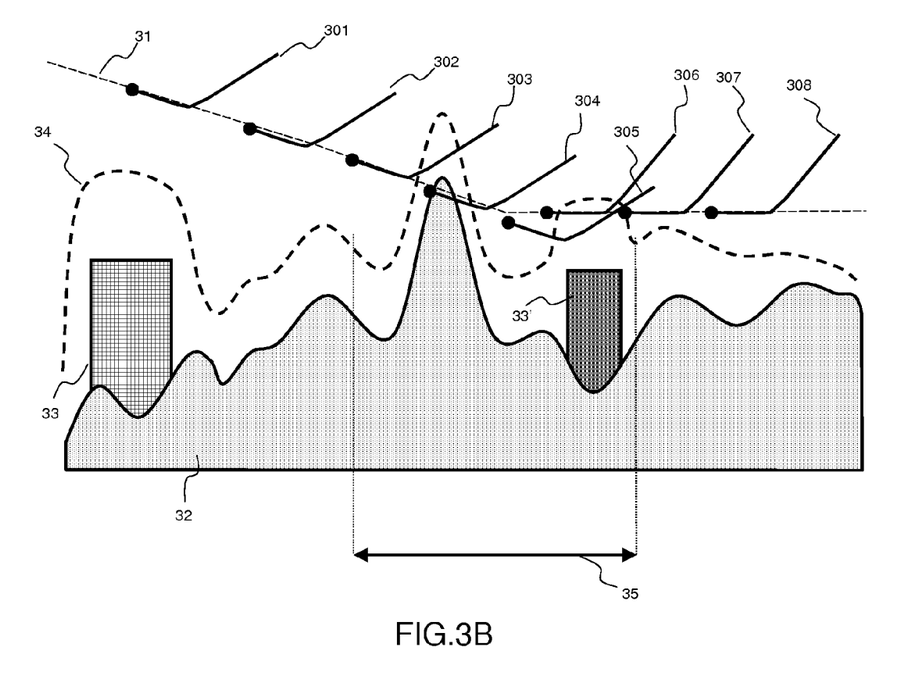
FIG. 3B represents a calculation of extrapolated obstacle avoidance trajectories according to a sampling of points of the flight plan.

FIG. 3B represents a 5D trajectory in the vertical plane generated by the flight management system and a succession of extrapolated trajectories 301, 302, 303, 304, 305, 306, 307 and 308 as described in FIG. 1. These trajectories are obtained from a processing resource of the aircraft. The terrain 32 is represented, as are obstacles 33, 33', the terrain 32 and the obstacles 33, 33' defining an envelope 34 corresponding to a safety margin, below which the hazard indication is maximum, the latter corresponding to a collision.

Each of the extrapolated trajectories is compared to the environmental database which is, in this example, the obstacle and terrain database.

The envelope 34 defines a safety margin which enables an aircraft to undertake a corrective avoidance maneuver during a determined time. The prediction of any crossings of the envelope 34 by the aircraft consists in collecting the points of the extrapolated trajectories from which the envelope 34 is crossed.

The extrapolations of the avoidance trajectory of the aircraft depend on the performance conditions specific to the aircraft, these data being obtained from a performance model of the system according to the invention. In general, the avoidance trajectories are calculated over a short space of time (for example, the TAWS calculates the trajectories extrapolated over a duration of 2 minutes) from the passage time setpoint at the point.

The system according to the invention makes it possible to collect the points of the 5D trajectory from which the warnings are generated if the aircraft observes the initial flight plan.

The system according to the invention therefore comprises a performance model of the aircraft, one or more database(s) comprising topological, obstacle and weather information, the flight management system notably delivering the flight plan, a computer generating the 5D trajectory from the flight plan and a sampling pitch.

The system according to the invention makes it possible to perform, from the onboard computer, a sampling of the flight plan, the pitch of which can be adjustable by the crew or predetermined. A set of avoidance trajectories can be defined of which the origins of each of the trajectories are the points derived from the sampling of the trajectory.

Each of the extrapolated trajectories is then calculated from:
- the position (latitude, longitude and altitude) of the point obtained from the sampling of the 5D trajectory;
- the speed setpoint at the point obtained from the sampling of the 5D trajectory;
- the passage time at the point obtained from the sampling of the 5D trajectory;
- the performance model of the aircraft.

The system thus makes it possible to know the positions, that is the points of origin of the extrapolated trajectories, at which a warning will be generated if the aircraft travels the 5D trajectory.

In one embodiment, the points of the trajectory that are selected can be spaced apart by a distance substantially corresponding to the length of the extrapolated trajectory, that is, the distance traveled at the speed of the aircraft over a predetermined time, for example two minutes for the obstacle avoidance trajectory for example.

In one embodiment, the sampling pitch of the 5D trajectory can be configured by the crew and can be defined by a distance unit or by a time unit.

The system according to the invention makes it possible to collect, for a set of points of the 5D trajectory, all the origins of the extrapolated trajectories for which at least one point is situated below an envelope 34. These are trajectories for which a warning would be generated if the aircraft were situated at the initial point of a trajectory extrapolated in flight at the predicted passage conditions.

The knowledge of the passage conditions by creation of the 5D trajectory enables the crew, before take-off for example, to know the points of the 5D trajectory at which a corrective maneuver will be necessary to avoid a passage in proximity to a hazardous area. These points are called the "engagement points" of a corrective maneuver.

In the example of FIG. 3B, the extrapolated trajectories 303, 304, 305 and 306 comprise points below the envelope 34 defining the safety margin. The passage points 303, 304, 305, 306 of the 5D trajectory included in the area 35 are points at which an alarm will be transmitted to the crew if the flight plan is traveled without modification. The area 35 is therefore an area including a hazard for the safety of the aircraft, the origin of the extrapolated vertical trajectory 303 being an engagement point at which the crew must begin a corrective maneuver.

The system according to the invention makes it possible to collect all the points of origin obtained from the sampling of the extrapolated trajectories extending beyond the envelope 34.

In these conditions, the crew can modify the flight plan so as to anticipate the passages in proximity to areas including a hazard. This advantage makes it possible notably not to have to perform corrective maneuvers in flight.

In one embodiment, the system according to the invention makes it possible to generate lateral extrapolation trajectories, as defined in FIG. 2, in the same way as the vertical trajectories, defined in FIG. 1, and to correlate them with the terrain and obstacle database.

In another embodiment, the system according to the invention is capable of generating lateral and vertical trajectories and of correlating them with the terrain and obstacle database.

Figure 4:
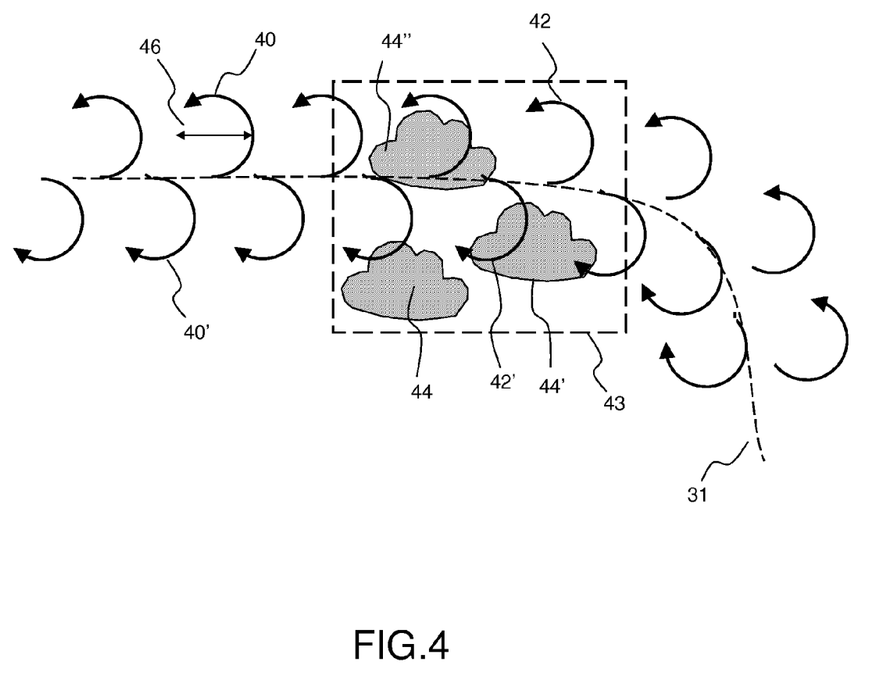
FIG. 4 represents a calculation of extrapolated trajectories for avoiding risky weather areas according to a sampling of points of the flight plan.

FIG. 4 represents a 5D trajectory 31, seen from above, obtained from a predefined flight plan. A set of extrapolated lateral trajectories each form substantially an arc of circle as defined in FIG. 2. These extrapolated lateral avoidance trajectories make it possible to anticipate a corrective maneuver in order to avoid passages in proximity to hazardous weather areas.

The extrapolated lateral trajectories are calculated from sampled points of the 5D trajectory.

The hazardous weather areas are obtained from a basis of an onboard digital weather model in the aircraft. This model comprises weather data forming areas including a threat level and it also comprises information relating to the prediction of how they will evolve in time. Data describing the trend of the winds in the navigation area planned for the aircraft are also stored in a database of the aircraft. These data are available through measurements generally performed by at least one radar or received via data communication links with the ground, such as WIMS for example.

The position of an aircraft correlated with a threat level and the position of a weather area makes it possible to establish a hazard indication.

Certain trajectories 40, 40' do not include points situated in a weather area that constitutes a threat to the aircraft. On the other hand, other trajectories 44, 44', 44" and 42 are situated in an area that constitutes a threat to the aircraft.

The interception of an extrapolated lateral trajectory with an area that constitutes a threat then defines an area including a high hazard indication.

Each of the trajectories is then calculated from:
- a position (latitude, longitude and altitude) of a point obtained from the sampling of the trajectory 31;
- the speed setpoint at the sampled point;
- the performance model of the aircraft;
- the passage time at the point obtained from the sampling of the flight plan incorporating the trend of the weather data in time.

The system according to the invention makes it possible to collect the extrapolated trajectories 44, 44', 44" and 42 so as to identify the areas that are hazardous to the aircraft.

A new 5D trajectory can then be recalculated from a modification of a portion of the flight plan. The latter is calculated so as not to pass in proximity to areas that constitute a threat.

Thus, the alarms, which would have been generated if the flight plan had not been modified, can be avoided on redefining a new flight plan.

Advantageously, the sampling pitch of the points of the flight plan from which are calculated the extrapolated lateral trajectories can be defined so that the extrapolated lateral trajectories, on one and the same side of the flight plan (right lateral side or left lateral side), are spaced roughly by the distance formed by the mean diameter 46 of the extrapolated trajectory 40.

The sampling of the 5D trajectory comprises a first set of points from which are calculated the lateral trajectories generated on one side of the flight plan and a second set of points from which are calculated the lateral trajectories generated on the other side of the flight plan. The two sets of points can be separate or can include the same points.

These two sets of points constitute all the origins from which are calculated the extrapolated lateral avoidance trajectories.

In a similar embodiment, the system according to the invention makes it possible to generate extrapolated vertical trajectories in the same way as the extrapolated lateral trajectories, and correlate them with the weather database.

In another embodiment, the system according to the invention is capable of generating lateral and vertical trajectories and of correlating them with the weather database.

The system according to the invention makes it possible to detect the points at which a warning will occur enabling the crew to perform a corrective maneuver undertaken no later than to guarantee the safety of the aircraft.

Moreover, the system according to the invention makes it possible to detect all the collision avoidance warnings generated on a predetermined flight plan and their associated hazard level.

Similarly, according to the weather model, the system makes it possible to detect all the warnings generated on a given flight plan due to the weather conditions that do not make it possible to meet a sufficient safety level to guarantee the flight of the aircraft and their associated hazard level.

In these conditions, before a flight, on the generation, the reception or the verification of the flight plan by the crew, a new flight plan can be generated incorporating new passages at points that are not situated in proximity to hazardous areas.

Similarly, during a flight, in a procedure to rejoin a flight plan, the system according to the invention is capable of establishing the rejoining 5D trajectory and of collecting the points that include a hazard.

The system makes it possible to calculate the positions of a set of points of the 5D trajectory and to calculate, for each of them, the extrapolated lateral and vertical hazard area avoidance trajectories.

One advantage of the system, as described in the invention, lies in the capacity to warn, notably before a take-off, in the case where the crew is preparing to follow a predetermined flight plan, of passage points in proximity to hazardous areas and the points at which warnings will be generated.

Such a system makes it possible to detect the hazardous areas very early, that is, immediately the flight plan by air traffic control is received by the crew. Because of this, the system makes it possible to obtain an increase in safety to ensure the flight of the aircraft.

One advantage of the system, as described in the invention, lies in the capacity to guarantee that in the absence of detection of hazardous points, the flight will proceed without warnings being triggered, the detection of hazardous points being based on the taking into account of the margins and of the anticipation delays incorporated in the TAWS or WXR-type monitoring devices.

In another embodiment for an operation of the system according to the invention when the aircraft is in flight, the system, from a position of the aircraft, is capable of generating the trajectory obtained from the instantaneous gradient of the aircraft. The linear trajectory thus generated can be sampled in order to define a 5D trajectory, the passage conditions at the sampling points being able to be calculated from the origin position. In the latter embodiment, extrapolated lateral trajectories can be defined from the sampling points of the 5D trajectory.

The determination of the hazardous areas by correlation of the extrapolated lateral trajectories and the environmental database makes it possible to define a set of points of the linear trajectory for which a corrective maneuver will be necessary.

In these conditions, the crew can act accordingly to reestablish a new heading and reexamine a new linear trajectory obtained from a new instantaneous gradient.

Figure 5:
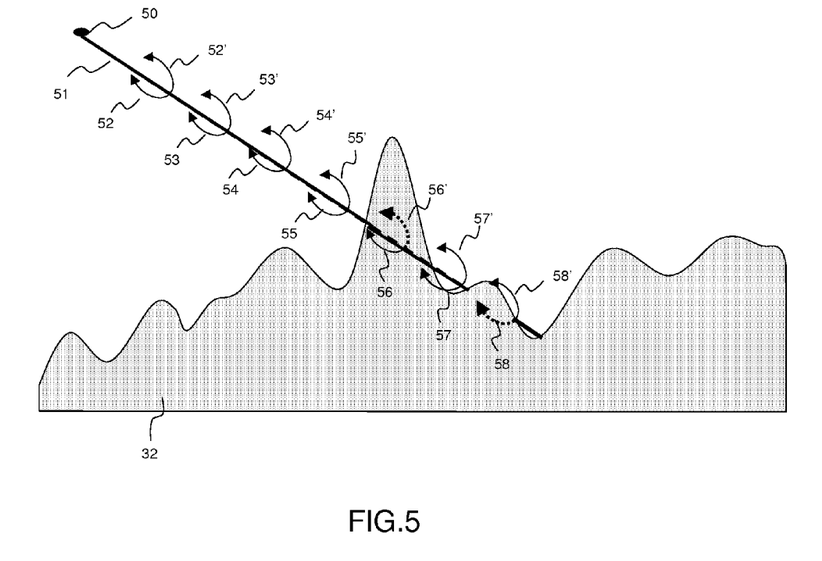
FIG. 5 represents a 5D trajectory generated from the instantaneous gradient of an aircraft and the flight conditions.

FIG. 5 represents the position of an aircraft 50 and the trajectory 51 generated from its instantaneous gradient at a given instant. A first set of extrapolated lateral trajectories 51, 52, 53, 54, 55, 56, 57, 58 on a first side are generated and the second set of extrapolated lateral trajectories 51', 52', 53', 54', 55', 56', 57', 58' on a second side are generated according to a predefined sampling pitch.

In this example, a first extrapolated lateral trajectory 56' intercepts the relief 32 and a second extrapolated lateral trajectory 58 also intercepts the relief 32, a situation corresponding to a passage into a pass for example.

The system according to the invention is then able to warn the crew about the points including a hazard to the aircraft if the heading is maintained. These points are identified by the correlation of the extrapolated lateral trajectories and the terrain database.

One advantage of such a system in the latter embodiment is to be able to warn the crew during a flight, regardless of whether it is following a flight plan, of areas that constitute a threat with fixed heading from the construction of a 5D trajectory.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A system for securing an aircraft flight plan comprising:
a flight management system delivering, from input setpoints, a scheduled trajectory defining a path to be followed by the aircraft to link a point of departure to a point of arrival, the scheduled trajectory comprising a set of points identified in space by at least a longitude and a latitude, each of the points having passage setpoints at these points in terms of speed, altitude and time; and
an avionics computer having resources allocated to various functions of the aircraft;
wherein the computer samples a set of sampled trajectory points of the scheduled trajectory according to a predetermined sampling pitch, each of the sampled trajectory points including a position, a heading to be followed, a speed profile on passing the position, and a passage time.

2. The system as claimed in claim 1, comprising at least one resource for storing a set of terrain data and a set of weather data dependent on time, the data of both sets comprising areas of space forming a potential threat to the aircraft, and in that the computer for each sampled trajectory point evaluates whether the sampled trajectory point belongs to one of the areas constituting a threat.

3. The system as claimed in claim 2, comprising a description model of the trend of winds in a predetermined navigation area.

4. The system as claimed in claim 1, wherein the scheduled trajectory is a straight line generated based on an instantaneous gradient of the aircraft.

5. The system as claimed in claim 1, further comprising:
a performance model of the aircraft defining limiting flight conditions according to performance capabilities of said aircraft; and
at least one processing resource for calculating avoidance trajectories at each of the sampled trajectory points according to the passage conditions at the sampled trajectory points and to at least an avoidance profile established from the performance model of the aircraft during a limited period.

6. The system as claimed in claim 5, wherein the avoidance profile is a lateral trajectory.

7. The system as claimed in claim 6, wherein the sampling pitch of the sampled trajectory points is substantially equal to a mean radius of a circle comprising a lateral avoidance trajectory.

8. The system as claimed in claim 5, wherein the avoidance profile is a vertical trajectory.

9. The system as claimed in claim 8, wherein the sampling pitch of the sampled trajectory points is substantially equal to a length of a vertical avoidance trajectory.

10. A system for securing an aircraft flight plan comprising:
a flight management system delivering, from input setpoints, a scheduled trajectory defining a path to be followed by the aircraft to link a point of departure to a point of arrival, the scheduled trajectory comprising a set of points identified in space by at least a longitude and a latitude, each of the points having passage setpoints at these points in terms of speed, altitude and time; and
an avionics computer having resources allocated to various functions of the aircraft;
wherein the computer samples a set of sampled trajectory points of the scheduled trajectory according to a predetermined sampling pitch, each of the sampled trajectory points including a position, a heading to be followed, a speed profile on passing the position, and a passage time,
the scheduled trajectory is a straight line generated based on an instantaneous gradient of the aircraft, and
the system further comprises:
a performance model of the aircraft defining limiting flight conditions according to performance capabilities of said aircraft; and
at least one processing resource for calculating avoidance trajectories at each of the sampled trajectory points according to the passage conditions at the sampled trajectory points and to at least an avoidance profile established from the performance model of the aircraft during a limited period.

11. The system as claimed in claim 10, wherein the avoidance profile is a lateral trajectory.

12. The system as claimed in claim 11, wherein the lateral avoidance trajectories are extrapolated lateral trajectories for avoiding weather areas constituting a threat to the aircraft.

13. The system as claimed in claim 12, wherein the extrapolated lateral trajectories for avoiding weather areas substantially form an arc of circle.

14. The system as claimed in claim 11, wherein the sampling pitch of the sampled trajectory points is substantially equal to a mean radius of a circle comprising a lateral avoidance trajectory.

15. The system as claimed in claim 10, wherein the avoidance profile is a vertical trajectory.

16. The system as claimed in claim 15, wherein the computer collects interference points in space, that correspond to interferences between the points of the avoidance trajectories generated from each sampled trajectory point and of areas obtained from the database constituting a threat.

17. The system as claimed in claim 16, wherein the computer collects all origins of the avoidance trajectories having at least one critical interference point.

18. The system as claimed in claim 15, wherein the vertical avoidance trajectories are extrapolated terrain and obstacle avoidance trajectories comprising a first segment corresponding to a reaction time, a curve corresponding to a change of heading of the aircraft, and a second segment corresponding to a climb of the aircraft.

19. The system as claimed in claim 15, wherein the sampling pitch of the sampled trajectory points is substantially equal to a length of a vertical avoidance trajectory.

\* \* \* \* \*